United States Patent
Yasuda et al.

(10) Patent No.: US 7,251,595 B2
(45) Date of Patent: Jul. 31, 2007

(54) DIALOGUE-TYPE INFORMATION PROVIDING APPARATUS, DIALOGUE-TYPE INFORMATION PROVIDING PROCESSING METHOD, AND PROGRAM AND RECORDING MEDIUM FOR THE SAME

(75) Inventors: Norihito Yasuda, Zama (JP); Kohji Dohsaka, Atsugi (JP); Kiyoaki Aikawa, Kawasaki (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1253 days.

(21) Appl. No.: 10/059,884

(22) Filed: Jan. 29, 2002

(65) Prior Publication Data

US 2002/0169594 A1    Nov. 14, 2002

(30) Foreign Application Priority Data

Mar. 22, 2001 (JP) ............................ P2001-082632
Mar. 23, 2001 (JP) ............................ P2001-085884

(51) Int. Cl.
*G06F 17/27* (2006.01)

(52) U.S. Cl. ..................... 704/9; 704/270.1; 704/270

(58) Field of Classification Search ............... 704/231, 704/246, 239, 240, 270, 271, 270.1, 275, 704/235, 238, 9, 251, 7; 379/88.01
See application file for complete search history.

(56) References Cited

U.S. PATENT DOCUMENTS 6,418,199 B1 * 7/2002 Perrone ................. 379/88.01
7,050,977 B1 * 5/2006 Bennett .................. 704/270.1

OTHER PUBLICATIONS

Task Adaptive Efficient Dialogue Control Method, IPSJI Research Report 2001-SLP-35, Feb.2/3, 2001.

* cited by examiner

*Primary Examiner*—Richemond Dorvil
*Assistant Examiner*—Huyen X. Vo
(74) *Attorney, Agent, or Firm*—Darby & Darby

(57) ABSTRACT

The invention makes it possible to avoid an increase in the number of confirmation sentences and response sentences output to the user which gives dissatisfaction for the user by the increase that occur due to recognition errors. The present invention provides a device for determining the content of the request input by the user and the information types that can be provided to the user; a device for generating a dialogue sequence that includes confirmation for the user for each information type and a dialogue sequence that does not carry out confirmation; a device for calculating the dialogue cost of each dialogue sequence; a device for calculating the optimal dialogue cost for each of the information types, a device for calculating the next most optimal dialogue cost in the case that each of the attributes of the content of the request is first confirmed; a device for calculating the loss due to the confirmation of the attributes from the difference therebetween, a device for calculating the expected loss due to the confirmation of the attributes taking into consideration the probability of the information type, and a device for prioritizing and confirming the attributes whose expected loss is minimal.

7 Claims, 4 Drawing Sheets

DIALOGUE-TYPE INFORMATION PROVIDING APPARATUS, DIALOGUE-TYPE INFORMATION PROVIDING PROCESSING METHOD, AND PROGRAM AND RECORDING MEDIUM FOR THE SAME

BACKGROUND OF THE INVENTION

1. Field of the Invention

The present invention relates to the technological field of a dialogue-type information providing service, and in particular, in a dialogue-type information providing system in which a confirmation sentence for confirming the content of a request is output to a user as a character string or speech when the user inputs a sentence denoting a request for information as a character string or speech, wherein, in the case that the user inputs a sentence denoting approval as a character string or speech for the confirmation sentence, the service records the request approved by the user, and in the case that the user inputs a sentence denoting disapproval as a character string or speech, the service waits for the user to input a sentence denoting a new request for information as a character string or speech, and after the type of user request is unambiguously determined among the dialogues between this user and the information provider, the service outputs to the user as a character string or speech a response for providing the information depending on the content of the request approved by the user, and thereby, the dissatisfaction of the user can be decreased.

The present invention also relates to a spoken dialogue apparatus, and in particular relates to a technology that confirms a user request by a spoken exchange, and minimizes the number of the exchanges (turns) with the user in processing the user request.

2. Description of the Related Art

A dialogue-type information presentation service, as represented by the spoken dialogue apparatus, generally comprises the following type of dialogue sequence. When there is a database that stores various types of information such as weather information, television program schedules, event scheduling information, or timetables for transportation systems, if a user inputs a sentence denoting a request for information stored in the database as a character string or by voice using the keyboard, mouse, voice recognition apparatus, or combination thereof, on a computer, first the information provider outputs a sentence series for confirming the content of the user's request to the user via the display, printer, typewriter, voice syntheses apparatus, or combination thereof, on a computer. In the case that the user inputs as a character string or spoken words a sentence denoting the approval of the confirmation, the information provider stores the content of the request that has been approved by the user. In the case that the user inputs as a character string or spoken words a sentence denoting disapproval of the confirmation, the information provider waits for the user to input a sentence denoting a further request. After this is repeated several times and the type of information that should be provided to the user is unambiguously determined, a response sentence for providing information depending on the content of the request approved by the user is output as a character string or voice.

In this type of dialogue-type information providing service, as a first conventional technology, in order to confirm the content of the user's request, there is a method in which the content of the requests input by the user are all confirmed. In addition, as a second conventional technology, there is a method wherein, in the case that the content of the request generated from a sentence input by the user is correct and the information type to be provided to the user has been unambiguously determined, in a dialogue sequence in which all or a portion of the content of the generated request is confirmed, the user approves the confirmation, and the information provider outputs a response sentence depending on the approved content, where the content confirmed by the user is determined such that the total of the individual confirmation sentences and response sentences output by the information provider is minimized. Moreover, in either the first conventional technology or second conventional technology, the content of the request of the user is represented as a set of combinations of attributes and values.

In the first conventional technology, when the sentences input by the user are analyzed and a set of combinations of attributes and values that represent the content of the request of the user is generated, sentences for summarizing all of the attributes that form the content of this request are output. In this conventional technology, there is the problem that an increase in the dissatisfaction of the user accompanies the recognition errors when generating the content of the request based on the sentences input by the user. This will be explained next.

Because recognition error of the character string or the voice accompanies the generation of the content of the request based on sentences that the user inputs as a character string or by voice, there are cases in which the content of a request is generated that differs from the content of the request that the user intends. In this case, the content of the sentence output by the information provider for confirmation differs from the content of the request that the user intended. Because the user inputs a sentence that denotes disapproval, the information requested by the user is not output to the user. The user inputs content for making the request again, the information provider requires reconfirmation, and thereby the dissatisfaction of the user increases.

In order to avoid the increase in the dissatisfaction of the user, it is necessary to decrease the number of confirmation sentences output by the information provider. Thus, in the second conventional technology, in the case it is assumed that the content of the request generated from a sentence input by the user is correct and the information type provided to the user has been unambiguously determined, in a chain of dialogue sequences in which all or a portion of the attributes included in the content of the generated request is confirmed, the user approves the confirmation, and the information provider outputs a response sentence depending on the requested content that has been approved, the attributes to be confirmed by the user are determined such that the total of individual confirmation sentences and response sentences are minimized.

The total of the numbers of confirmation sentences and response sentences output during the dialogue sequence is called the dialogue cost of the dialogue sequence. The reason for taking into consideration the number of response sentences is that there is the possibility that the degree of the user's dissatisfaction will increase if the number of response sentences increases.

The second conventional technology has the limitation that it can be applied in the case in which it is assumed that the content of the request generated based on sentences input by the user is correct and the type of information to be provided to the user is unambiguously determined, and in the case that this assumption is not satisfied, there is the problem that the dissatisfaction of the user increases because the second conventional technology cannot be used while the first technology must be used.

Below, a concrete example of the problems of the first conventional technology and the second conventional technology will be explained. As an example, consider an information providing service relating to weather information. There are two types of information that can be provided to the user: the location and time of the weather and warnings announced at certain locations. The content of the user's request is represented by two attributes (items): location and information type. The location attribute can take the value of a prefecture name such as Kanagawa Prefecture or Kagawa Prefecture, and the information type can take the values weather and warning.

Now, suppose a situation in which the information provider maintains the data "presently no warnings have been issued anywhere". At this time, the user inputs a sentence denoting the request "Please inform me about warnings for Kanagawa Prefecture," and due to recognition errors or the like, the information provider mistakenly recognized the content of the user's request to be "Please inform me about warnings for Kagawa Prefecture." The content of the generated request is the set of attributes and values wherein the value of the attribute location is Kagawa Prefecture and the attribute of the information type is warning. This set of attribute and value combinations is written as follows:

{<location, Kagawa Prefecture>, <information type, warning>}

In this case, in the first conventional technology, the information provider outputs the sentence for confirmation, "Are you interested in warnings for Kagawa Prefecture?", in order to confirm all of the attributes included in the content of the request generated based on the sentence of the user. The user inputs the sentence "No" denoting disapproval, since the content of the intended request differs from the content of the confirmation, and then must input the sentence "warnings for Kanagawa Prefecture" to make the request again. Next, the information provider generates a new content of the user's request. This time, when the content of the request of the user can be correctly generated, the information provider outputs the confirmation sentence "Are you interested in warnings from Kanagawa Prefecture?" The user inputs the sentence "yes", denoting approval, and the information provider outputs the one response sentence "No warnings for Kanagawa Prefecture have been issued." Thus, the information provider outputs a total of three sentences: a confirmation sentence "Are you interested in warnings for Kagawa Prefecture?"; a confirmation sentence "Are you interested in warnings for Kanagawa Prefecture?"; and a response sentence "No warnings for Kanagawa Prefecture have been issued." The user is requested for confirmation two times, which increases the dissatisfaction.

The second conventional technology determines which among the attributes included in the request content should be confirmed. In the presently assumed example, as indicated below, there are two attributes included in the content of the request: the location "Kagawa Prefecture" and the warnings:

{<location, Kagawa Prefecture>, <information type, warning>}

To repeat, due to recognition error, the content of this request differs from the content of the request for information about warnings in Kanagawa Prefecture that the user wishes to know.

First, the content of the request is confirmed, the user's approval is input, all dialogue sequences for a response are generated, and the dialogue sequence is selected for which the total of the number of confirmation sentences and response sentences, that is, the dialogue cost, is minimized.

Here, two dialogue sequences are considered: a dialogue sequence A, in which both the two attributes of location and information type are confirmed until the approval of the user is input, and subsequently, one response sentence whose content is that the location approved by the user has no warnings issued, is generated, or a dialogue sequence B, in which one attribute among location or information type is confirmed until the user's approval is input, and subsequently, one response sentence whose content is that no warnings have been issued anywhere, is generated.

In the second conventional technology, when an attribute is approved, it is necessary to estimate the number of confirmation sentences output until the user will approve. The number of confirmation sentences output until the user approves depends on the precision with which the value of the attribute is confirmed and the like. There is the possibility that the values of each of the attributes may differ from the request intended by the user due to recognition error. Thus, to the extent that the confirmed attributes are increased, the possibility of the user disapproving the confirmation increases, and the number of confirmation sentences will increase by an equivalent amount. Here, it is assumed that the number of confirmation sentences is estimated to be twice the number of attributes to be confirmed.

In sequence A, the confirmation sentence "Are you interested in warnings for Kagawa Prefecture?" is output. The user disapproves the confirmation because the content of the intended request and the content of the request differ, and the request is carried out again. It is estimated that until the user inputs approval, the number of confirmation sentences output while confirming the two attributes location and information type will be 4. When approved, the information provider outputs the confirmation sentence "Are you interested in warnings from Kanagawa Prefecture?", the user approves this confirmation, and the one response, "No warnings have been issued for Kanagawa Prefecture," is output. The dialogue cost is 5, which is the total number of confirmation sentences and response sentences.

In sequence B, the confirmation sentence "Are you interested in warnings?" is output. Until an approval is input from the user, the number of confirmation sentences output while confirming the one attribute information type is estimated to be two. When the user approves the confirmation, the one response sentence, "There are no warnings issued anywhere," is generated. The dialogue cost is 3, which is the total number of the confirmation sentences and response sentences.

In conclusion, sequence B, having the lowest dialogue cost, is chosen, and the information provider outputs the confirmation sentence, "Are you interested in warnings?", in order to confirm only the attribute information type.

In this manner, there are cases in which the problems of the first conventional technology are solved by the second technology. However, when assuming that the content of the request generated based on the sentences that the user inputs are correct, application is restricted to the case in which the information type provided to the user can be unambiguously determined, and in the case that this assumption cannot be satisfied, there are the problems that the second conventional technology cannot be used, the first conventional technology must be used, and the dissatisfaction of the user is increased.

For example, suppose the situation in which the information provider maintains as data in a database the data: "Presently no warnings have been issued anywhere." The user inputs a sentence denoting the request, "Please inform me about warnings for Kanagawa Prefecture", and due to a recognition error, the information provider mistakenly recognizes "Kanagawa Prefecture" as "Kagawa Prefecture", and does not recognize "warnings" at all. The content of the request will be mistakenly recognized to be the content "Please inform me about Kagawa Prefecture". The content of the generated request will be the following:

{<location, Kagawa Prefecture>}

When it is assumed that the content of this request is correct, there are two types of information that can be provided to the user: weather and warnings. The determination of which is intended cannot be made. Therefore, the second conventional technology cannot be applied. The first conventional technology must be used, and the confirmation sentence "Kagawa Prefecture?" is output. As has already been explained, because this differs from the content of the request intended by the user, the user inputs the content for the request again, a reconfirmation is required by the information provider, and the dissatisfaction of the user increases.

When the determination is based on the content of the request, the reason that the second conventional technology cannot be applied in the case that there is a plurality of information types to be provided is that no method is provided that compares the number of confirmation sentences and response sentences in the dialogue sequences for each type of information. However, even in the case that the there may be a plurality of information types to be provided, by calculating the probability of each information type, determining the dialogue sequence that minimizes the total total of the number of confirmation sentences and response sentences for each information type, and then taking into consideration the probability of each information type, there are cases in which the attributes to be confirmed can be selected so as to make the total of the number of confirmation sentences and reply sentences as small as possible. Next, consider an example thereof.

In the situations assumed above, the types of information are either warnings or weather. Considering that the probabilities of the information types are equal, the probability of the information type "warning" is 0.5, and the probability of the information type "weather" is 0.5.

Next, for each of the provided information types, the dialogue sequence having the minimum dialogue is determined, this dialogue sequence is called the optimal dialogue sequence related to this information type, and this dialogue cost is called the optimal cost for this information type.

Consider when the information type is a warning. Under the assumption that this is a warning, since it is determined that there is one information type, the second conventional technology can be used. The dialogue sequence in which the number of the confirmation sentences and the number of response sequences is minimized is dialogue sequence B, wherein the a response is output after the information type has been confirmed and the user has approved. The dialogue cost of dialogue sequence B is 3. The optimal dialogue sequence related to the information type "warning" is dialogue sequence B, and the optimal cost is 3.

Consider when the information type is weather. At this time, all the dialogue sequences are generated in which the content of the request is confirmed, the approval of the user is awaited, and a response is made. The dialogue sequence having the minimum dialogue cost is selected. Here, these dialogue sequences can be considered: a dialogue sequence C, in which the location is confirmed until the approval of the user is input, and next, the information type is confirmed until the approval of the user is input, and then a response is made; and a dialogue sequence D, in which the information type is confirmed until the approval of the user is input, the location is confirmed until the approval of the user is input, and then a response is made. In either of the dialogue sequences, the number of confirmation sentences is estimated to be 4. The response sentence is assumed to be generated by one sentence describing what the weather is at a certain location and at a certain time. The dialogue cost for either of the dialogue sequences is 5. The optimal dialogue sequences related to the information type "weather" is the dialogue sequence C and the dialogue sequence D, and the optimal cost is 5.

Next, taking into consideration the probability of the provided information types, the attributes to be confirmed are determined such that the total of the number of confirmation sentences and response sentences can be made as small as possible. Thereby, for each of the attributes that form the content of the request, the dialogue sequence having the minimum dialogue cost is calculated assuming that these attributes have been initially determined for each information type. This dialogue sequence is called the next most optimal dialogue sequence for confirmation of attributes, and the dialogue cost is called the next most optimal dialogue cost for confirmation of attributes. The number that results from subtracting the next most optimal cost for confirmation of attributes from the optimal cost is called the loss due to the confirmation of attributes. When the loss due to the confirmation of attributes is compared to the optimal cost when these attributes are initially confirmed, which bears the heaviest cost is designated. Taking into consideration the probability of each of the provided information types, if the attribute that minimizes as much as possible the expected value of the loss due to the confirmation of attributes is confirmed first, a dialogue sequence can be selected that has a dialogue cost as close as possible to the optimal cost.

For example, take into consideration the attributes "information type" and "location" as attributes to be confirmed. First, assume that the information type is confirmed. For the provided information type "warning", the next most optimal dialogue sequence for confirming the information type becomes the dialogue sequence B. The next most optimal cost for the confirmation of the information type is 3, and the loss due to the confirmation of the information type is 0. For the provided information type "weather", the next most optimal dialogue sequence for the confirmation of the information type becomes the dialogue sequence D, and the next most optimal cost for the confirmation of the information type is 5. The loss due to the confirmation of the information types is 0. Because the probabilities of each of the provided information types are equivalent, the expected value of loss due to the confirmation of the information types becomes 0.

Second, assume that the attribute "location" has been confirmed. For the provided information type "warning", the next most optimal dialogue sequence for the confirmation of the location becomes the dialogue sequence A. The next most optimal cost for the confirmation of the location is 5, and the loss due to the confirmation of the location is 2. For the provided information type "weather", the next most optimal dialogue sequence for the confirmation of the location becomes the dialogue sequence C, and the next most optimal cost for the confirmation of the location is 5. The loss due to the confirmation of the location is 0. Because the probabilities of each of the provided information types are equal, the loss due to the confirmation of the location is 0.

Therefore, if the content of the generated request is the content "Please inform me about Kagawa Prefecture", by the confirmation sentence "Are you interested in warnings or weather", the attribute "information type" can be initially confirmed, and the dialogue cost can be made as small as possible.

In fact, when the location is confirmed first, after a number of the confirmation sentences for the confirmation of the location are output, the information type is confirmed, and in the case that the information type is understood to be warnings, the confirmation sentence output for the confirmation of the location is useless. The reason is that in the case of warnings, whether or not the location is confirmed, the number of response sentences is identical, and if this is the case, the dialogue cost for the dialogue sequence that does not confirm the location can be made as small as possible. In contrast, even if the information type is confirmed first, and whether the information type is warnings or weather, the confirmation of the information type is not useless, and the dissatisfaction of the user is not increased.

Irrespective of whether there exists an attribute such that the expected value of the loss due to the confirmation of attributes is minimal, in the conventional technology, when the determination is made based on the content of the request, in the case that there is a plurality of information types to be provided, there is the problem that all of the attributes in the content of the request are to be confirmed. Thus, increasing the dissatisfaction of the user, which should be avoidable by using attributes such that the expected value of the loss due to the confirmation of attributes is minimized, cannot be avoided.

In addition, in the case that the provided information types are determined unambiguously according to the content of the request that the user has approved, if the optimal dialogue sequence does not include any confirmations, outputting a response that does not carry out any confirmations produces the smallest dialogue cost, and thus a response sentence should be output depending on the optimal dialogue sequence. The conventional technology does not take this point into account.

On the other hand, in a spoken dialogue apparatus, the content of the spoken words of a user are understood by speech recognition, and the content of the request of the user is determined. However, speech recognition has limitations, and there is the possibility that the results of the recognition will include errors. Therefore, in order for the spoken dialogue apparatus to confirm the content of the request of the user without depending only on the result of the speech recognition, the content of the words that have been understood by the apparatus must be confirmed.

In addition, when there is a difference between vocabulary and wording that can be accepted by the spoken dialogue apparatus, even if tentative confirmation of all the information in the range transmitted to the apparatus has completed, there are cases in which the content of the request of the user is not clear. In this case, the spoken dialogue apparatus must request information from the user.

The series of exchanges between the apparatus and the user generated by the confirmations and requests for information from this type of spoken dialogue apparatus is called a confirmation dialogue. If the content that can be processed change (tasks), the object of confirmation also changes. A method in which confirmation is carried out without increasing the number of dialogue exchanges even in the case that the task is updated is necessary.

Conventionally, in the case that a task is updated, the requests that can be received by the spoken dialogue apparatus that acts without increasing the number of dialogue exchanges is limited to one.

In addition, there is another conventional technology wherein the dialogue is carried out using a minimum of labor and a plurality of requests are received. However, in the case that a task is updated, rules must be defined manually, and a confirmation sequence such that the number of dialogue exchanges (number of tasks) would not increase automatically could not be applied.

Thus, in order to carry out confirmation without increasing the labor of the user when a task is updated using the conventional technology, it was necessary to limit the type of the content of the request of the user that could be pro-processed to one. However, actually, having this type of restriction is not practical.

In the case, for example, that video control is carried out using a spoken dialogue apparatus, at least "recording time setting", "change recording time setting", and "confirm recording time setting", must be carried out. Thus, with just these the device must already be able to accept three requests. In the case that a plurality of requests can be accepted, because the content that is confirmed by the requests differ, the confirmation cannot be carried out in a sequence that is determined before the fact.

In addition, the conventional technology that can accept a plurality of requests and carry out a dialogue with little labor requires manually defining rules in the case that a task is changed.

SUMMARY OF THE INVENTION

In consideration of the problems described above, in a dialogue type information providing apparatus, it is the object of the present invention to allow avoiding an increase in user dissatisfaction that accompanies the increase in the number of confirmation sentences and response sentences output to the user due to recognition error by prioritizing and confirming attributes such that the expected loss due to the confirmation of attributes is minimized even in the case that all attributes included in the content of the request are confirmed, as in the conventional technology.

In addition, an object further extend to provide a speech apparatus that can accept a plurality of processing content without the restrictions of the conventional technology, task application-type high efficiency dialogue processing that can grasp the request of the user by using a small number of dialogue turns even in the case that a task is updated.

A dialogue-type information providing apparatus is characterized in providing a device that receives requests for information, approval of confirmation, and disapproval of confirmation from the user, comprises: a device that receives from the user the request for information, approval of confirmations, and disapproval of confirmations; a device that, in the case a user inputs a sentence denoting a request for information, generates a set of combinations of attributes and values that represent the content of the request of the user by making a judgment based on the content of the request of the user recorded at the point in time that the content of input sentence and the sentence are input, records the set of combinations of attributes and values as the content of the request of the user, and when the user inputs a sentence denoting the approval of the confirmation for the confirmation sentence requesting confirmation of the attributes, the attributes are recorded as the content of requests approved by the user; a device that determines as provided information types all types of information that can be provided to the user by making a judgment based on the content of the request input by the user and the content of the requests approved by the user, and at the same time, calculates the probability of the provided information type; a device that, for each of the provided information types, requests confirmation of all or a part of the attributes that form the content of the requests that have not been approved by the user, and after the user approves the confirmations, generates a dialogue sequence in which information is provided depending on the content of requests approved by the user, and a dialogue sequence in which information is provided depending on the content of the request where confirmation is not carried out; a device that, for each of the dialogue sequences, estimates the total of the numbers of the confirmation sentences and response sentences included in the dialogue sequence, and calculates the estimated total as the dialogue cost; an device that, for each of the provided information types, selects the dialogue sequence having the minimal dialogue cost, makes the dialogue sequence having the minimal dialogue cost the optimal dialogue sequence, and makes the minimum dialogue cost the optimal cost; a device that, for each of the provided information types, selects the dialogue sequence that first requests confirmation of the designated attribute, selects the dialogue sequence having the minimum dialogue cost from among the dialogue sequences, makes this the next most optimal dialogue sequence for confirmation the attributes, and makes the minimum dialogue cost the next most optimal cost for confirming the attributes; a device that, for each of the provided information types, subtracts the optimal cost from the next most optimal cost, and makes the number that is the result of this subtraction the loss due to confirmation of the attributes; an expected loss calculating device that calculates the expected value of the loss that takes into consideration the probability of the provided information type based on the loss due to confirmation of the attributes for each of the provided information types; a device that, for each of the attributes included in the content of the request that have not been approved by the user, compares the expected losses due to confirmation of each of the attributes, selects the attribute having the minimum expected loss, and determines the attribute to be the confirmation attribute; and an device that outputs to the user a confirmation sentence to request confirmation the determined confirmation attribute. If there is a dialogue sequence that outputs a response sentence without carrying out confirmation, it is determined to be one that does not require carrying out a confirmation, and depending on this dialogue sequence, a response sentence is output to the user as an optimal cost dialogue sequence, and otherwise, a confirmation sentence that requests the confirmation of a confirmation attribute is output to the user as an optimal cost dialogue sequence.

In the present invention, in a dialogue sequence wherein, when the user inputs a sentence denoting a request for information as a character string or by voice, confirmation of all or a part of the attributes that form the content of the request that have not been approved by the user are found, and after the user has approved the confirmations, information stored in a database is provided depending on the content of the requests approved by the user, the total of the number of the confirmation sentences and the response sentences included in the dialogue sequence is calculated as the dialogue cost, the minimum dialogue cost for each of the provided information types is calculated as the optimal dialogue cost, and for each of the provided information types, the minimum dialogue cost in the case that each of the attributes included in the content of the requests not approved by the user are confirmed first is calculated as the next most optimal dialogue sequence due to the confirmation of the attributes; for each of the provided information types, the number equal to the optimal cost subtracted from the next most optimal cost for confirmation of the attributes is calculated as the loss due to the confirmation of the attributes; the expected value of the loss due to the confirmation of each of the attributes is calculated as the expected loss due to the confirmation of the attributes taking into consideration the probability of the provided information loss; and by prioritizing and confirming the attributes such that the expected loss is minimized, it is possible to avoid an increase in the dissatisfaction of the user that accompanies the increase in the number of confirmation sentences and response sentences output to the user that occur due to recognition error.

The spoken dialogue apparatus of the present invention is mainly characterized in determining the actions of the apparatus such that the expected number of turns until the completion of the dialogue is made as small as possible by using the expected number of turns until the confirmation of the request of the user has completed and the probability distribution of the user's request with respect to the recognition state of the apparatus at each point in time, assuming that the user's requests have been defined.

The recognition state of the spoken dialogue apparatus is represented by a set comprising an attribute (item names such as "weekday", "location", "interviewer"), a value (such as "Sunday", "Conference Room 3", and "Section-chief Yamada"), and the likelihood of these values, and these attributes are called slots. In order to obtain the expected number of turns until the completion of the user request, the expected number of turns for confirming a particular slot group is estimated. This number of turns is found using the speech recognition rate while confirming a particular slot group called the slot recognition rate.

Even if there is a user request having a high probability, when the number of turns necessary for this confirmation is huge, if there is a request whose confirmation can be completed using short turns even if the probability is somewhat low, there are cases in which first, the expected number of turns until the completion of the dialogue can be made short even if carrying out the confirmation of this request actually differs from the request of the user. In the present invention, using the probability of each user request and the expected value of the number of turns until the completion of the user's request, the content of among all confirmation sequences confirmation is selected from all confirmation sequences so that expected number of turns is the smallest. Furthermore, in the present invention, even if a task is updated, the designer does not have to describe a new the rules.

DETAILED DESCRIPTION OF THE INVENTION

Figure 1:
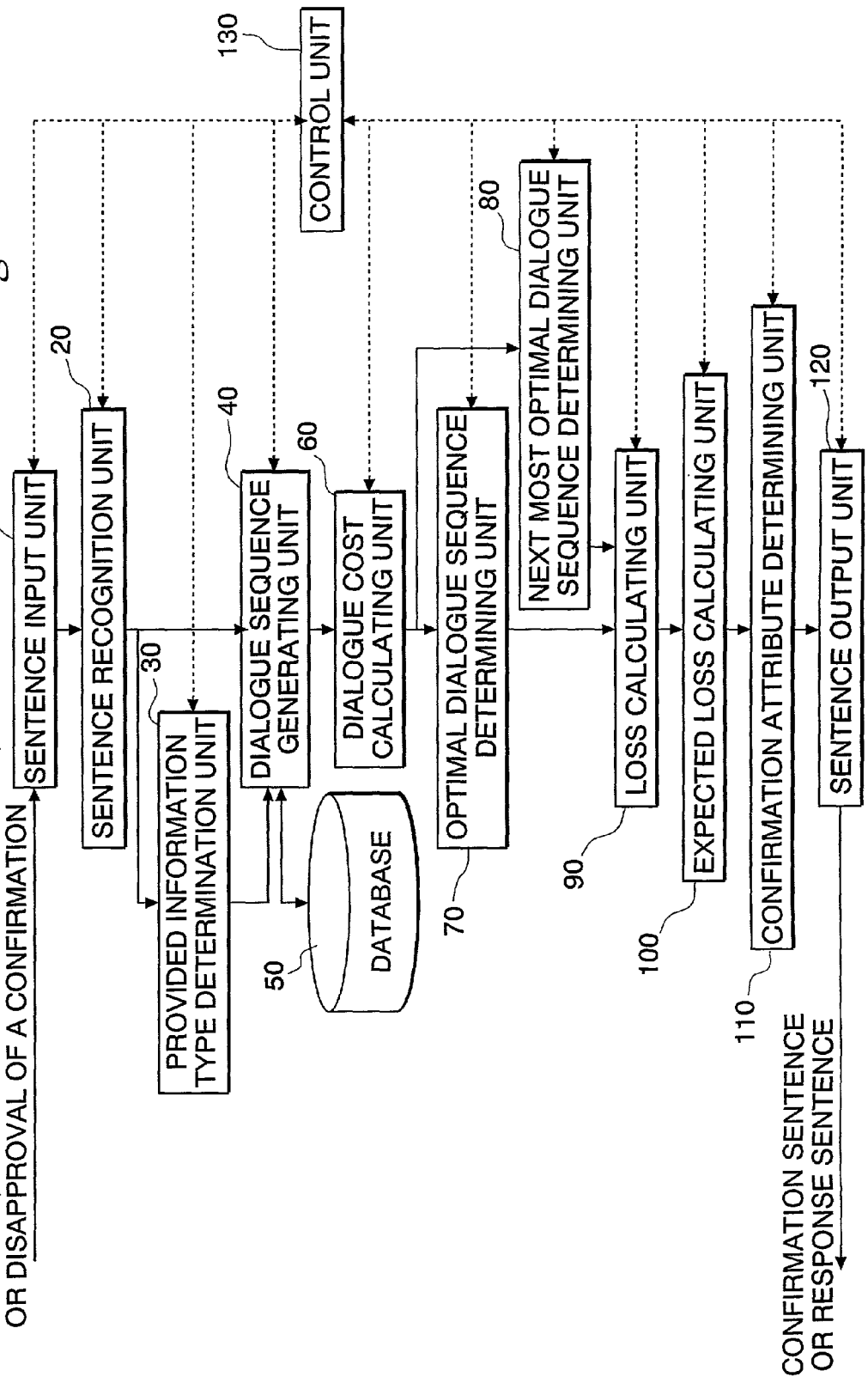
FIG. 1 is a block diagram showing an example of the structure of the apparatus of the present invention.

Below, an embodiment of the present invention will be explained while referring to the drawings.

FIG. 1 shows an example of the structure of the dialogue-type information providing apparatus according to the present invention. The present dialogue-type information presenting apparatus comprises a sentence input unit 10, a sentence recognition unit 20, an provided information type determination unit 30, a dialogue sequence generating unit 40, a database 50, a dialogue cost calculating unit 60, optimal dialogue sequence determination unit 70, next most optimal dialogue sequence determination unit 80, loss calculating unit 90, expected loss calculating unit 100, a confirmation attribute determination unit 110, a sentence output unit 120, and a control unit 130. The information to be provided to the user is stored in the database 50. In addition, the sentence input part 10 and the sentence output unit 120 connect to a user's terminal by a communication line (omitted in FIG. 1). Moreover, generally the present dialogue information providing apparatus constructed using what is termed a computer system.

The sentence input unit 10 inputs sentences that denote a request for information, the approval of a confirmation, or the disapproval of a confirmation input by the user as a character string or by speech via a keyboard, mouse, speech recognition apparatus, or a combination thereof, on a computer terminal.

In the case that a sentence denoting a request for information is input by a user, the sentence recognition unit 20 generates a set of combinations of attributes and values that represent the content of the request of the user by making a judgment based on the content of the request and the content of the request recorded when the sentence is input, records a set of combinations of these attributes and values as the content of the request of a user, and transfers these to the provided information type determination unit 30, the dialogue sequence generating unit 40, and the control unit 130. In addition, when the user inputs a sentence denoting the acceptance of the confirmation of a confirmation sentence requesting the confirmation of an attribute, the sentence recognition unit 20 records these attributes as the content of the request approved by the user, and transfers this to the provided information type determination unit 30, the dialogue sequence generating unit 40, and the control unit 130. In addition, when the user inputs a sentence that denotes the disapproval of the confirmation of the confirmation sentence, the disapproved signal is sent to the control unit 130.

The provided information type determination unit 30 determines all of the types of information that can be provided to the user as the provided information types by making judgments based on the content of the request of the user transferred from the sentence recognition unit 20 and the content of the request that has been approved by the user, and then calculates the probability of the provided information type. The provided information type determination unit 30 transfers the provided information types that have been determined to the dialogue sequence generating unit 40, and transfers the provided information types and the probabilities of the provided information types to the control unit 130.

For each of the provided information types transferred from the provided information type determination unit 30, based on the content of the request of the user transferred from the sentence recognition unit and the content of the request by the user, the dialogue sequence generating unit 40 requests the confirmation of all or a part of the attributes that form the content of the requests not approved by the user, and after the user approves the confirmation, generates a dialogue sequence that provides information stored in the database 50 depending on the content of the request approved by the user and a dialogue sequence that provides information stored in the database 50 depending on the content of the request without carrying out confirmation.

For each of the dialogue sequences transferred from the dialogue sequence generating unit 40, the dialogue cost calculating unit 60 estimates the total of the numbers of the confirmation sentences and the reply sentences included in the dialogue sequence, and generates an estimated total as the dialogue cost. The dialogue cost calculating unit 60 transfers the dialogue costs and dialogue sequences to the optimal dialogue sequence determination unit 70 and the next most optimal dialogue sequence determination unit 80.

For each of the provided information types, depending on the command of the control unit 130, using all of the dialogue sequences and dialogue costs transferred from the dialogue cost calculating unit 60, the optical dialogue sequence determination unit 70 selects the dialogue sequence having the minimal cost, generates the dialogue sequence having this minimal dialogue cost as the optimal dialogue sequence, and generates this minimal dialogue cost as the optimal cost. For each of the provided information types, the optimal dialogue sequence determining unit 70 transfers the generated optimal dialogue sequence and the optimal cost to the loss calculating unit 90, and transfers the optimal dialogue sequence to the control unit 130.

For each of the provided information types, depending on the commands from the control unit 130, the next most optimal dialogue sequence determining unit 80 selects the dialogue sequence that first requests the confirmation of the attribute designated by the control unit 130 from among all dialogue sequences transferred from the dialogue cost calculating unit 60, selects the dialogue sequence having the minimal dialogue cost from among these dialogue sequences, generates this dialogue sequence as the next most optimal dialogue sequence for confirmation of these attributes, and generates this minimum dialogue cost as the next most optimal cost for the confirmation of these attributes. For each of the provided information types, the next most optimal dialogue sequence determining units 80 transfer the next most optimal dialogue sequence and next most optimal cost for the confirmation of these attributes to the loss calculating unit 90.

For each of the provided information types, based on the commands from the control unit 130, the loss calculating unit 90 subtracts the optimal cost transferred from the optimal dialogue determination unit 70 from the next most optimal cost for the confirmation of the attributes transferred from the next most optimal dialogue sequence unit 80 in order to calculate the loss due to the confirmation of attributes designated by the control unit 130, and transfers the numbers that result from this subtraction to the expected loss calculating unit 100 as loss due to the confirmation of these attributes.

For each of the provided information types, based on the commands from the control unit 130, the expected loss calculating unit 100 calculates the expected value of the loss due to the confirmation of the attributes from the loss due to the confirmation of attributes transferred from the loss calculating unit 190 taking into consideration the probability of each of the provided information types, and this expected value is transferred to the confirmation attributes determining unit 110 as the expected loss due to the confirmation of attributes.

The confirmation attributes determining unit 110 compares the expected losses due to the confirmation of each of the attributes transferred from the expected loss calculating unit 100, selects the attribute for which the expected loss will be minimized, and transfers this to the sentence output unit 120 as the confirmation attribute.

In the case that a confirmation command is received from the control unit 130, the sentence output unit 120 outputs to the user a confirmation sentence requesting confirmation of the confirmation attribute transferred from the confirmation attribute determination unit 110, and in the case that a response command is received from the control unit 130, outputs to the user a response sentence depending on the dialogue sequence transferred from the control unit 130.

The control unit 130 stores the content of the request of the user and the content of the request approved by the user transferred from the sentence recognition unit 20, the probabilities of the provided information types transferred from the provided information type determination unit 30 and the provided information types, and the optimal dialogue sequence transferred from the optimal dialogue sequence determination unit 70. The control unit 130 controls the operation of each of the units 10 to 120 as follows:

(1) in the case that a disapproval signal is sent from the sentence recognition unit 20, the sentence input unit 10 is controlled such that it waits for the input of a request for information from a user;

(2) for each of the provided information types, the optimal dialogue sequence determining unit 70 is controlled such that it generates an optimal dialogue sequence and an optimal dialogue cost;

(3) for each of the provided information types, the next most optimal dialogue sequence determination unit 80 is controlled such that it calculates the next most optimal dialogue sequence and next most optimal cost for confirmation of the attributes for each of the attributes included in the content of the requests not approved by the user;

(4) the loss calculating unit 90 is controlled such that it calculates the loss due to the confirmation of these attributes for each of the attributes included in the content of the requests not approved by the user;

(5) the expected loss calculating unit 100 is controlled so as to calculate the expected value of the loss for the confirmation attributes for each of the attributes included in the content of the requests not approved by the user;

(6) if the conditions that the provided information type is determined unambiguously and the optimal dialogue sequence is the dialogue sequence carrying out the response without carrying out a confirmation have been satisfied, these optimal dialogue sequences are transferred to the sentence output unit 120, and the sentence output unit 120 is controlled so as to send a response command. If these conditions are not satisfied, control is carried out such that a confirmation command is sent to the sentence output unit 120.

Figure 2:
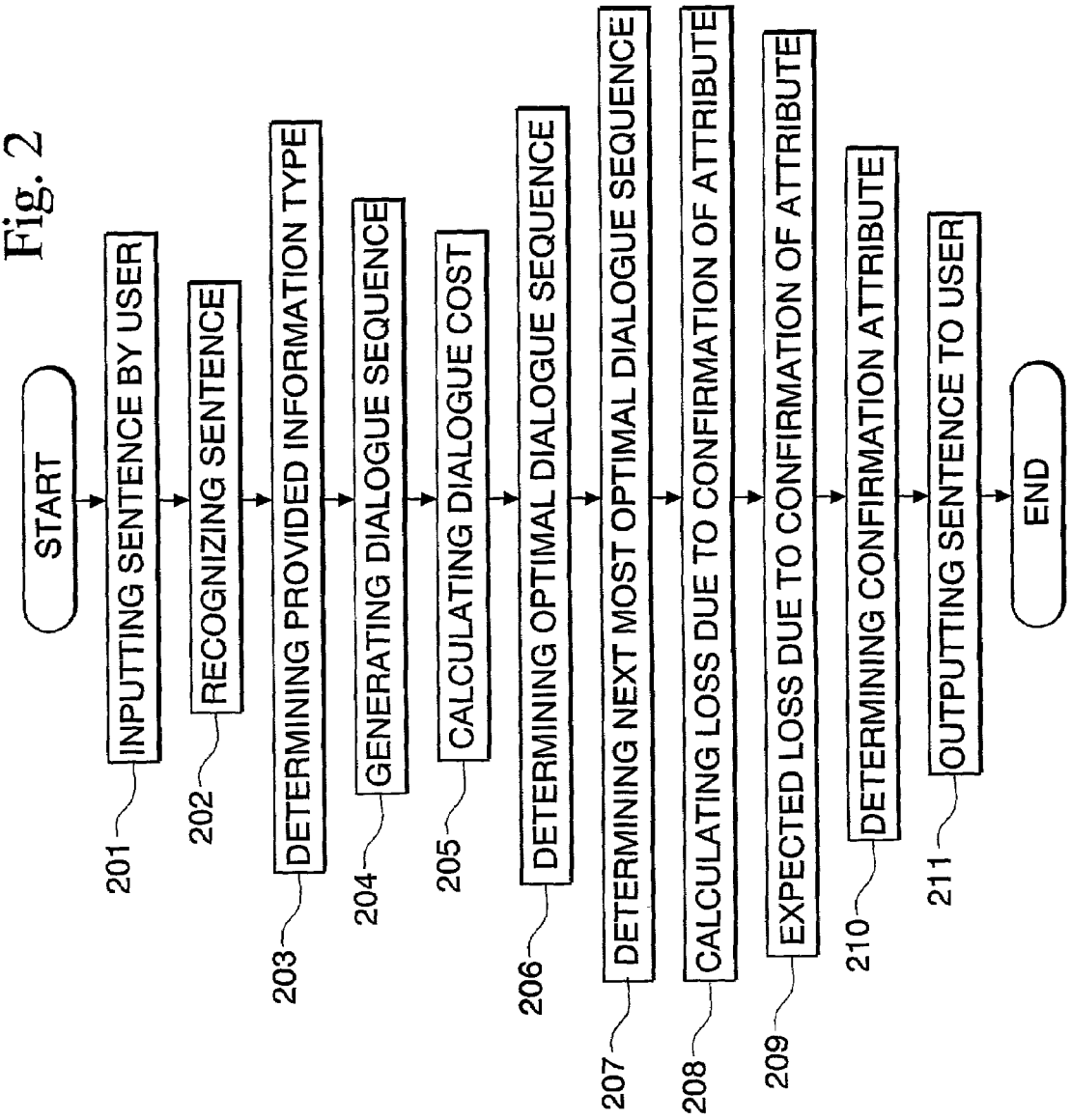
FIG. 2 is a processing flowchart showing an example of the structure of the apparatus of the present invention.

FIG. 2 shows a processing flowchart for the present dialogue information providing apparatus. In FIG. 2, each of the processes of steps 201 to 211 corresponds to each of the functions 10 to 120 in FIG. 1. Here, a program for executing on a computer each of the functions 10 to 120 in FIG. 1 (the processes in each of the steps 201 to 211 in FIG. 2) can be provided by being stored on a computer readable recording medium such as a floppy disc, a CD-ROM, or the like. Each of the expected functions in FIG. 1 can be realized by loading a program recorded on such a recording medium into a computer.

Below, a concrete example and the detailed operation of the embodiment of the present invention will be explained.

Consider, for example, an information providing service related to weather. Assume that there are two possible provided information types: weather and warnings. The content of the request of the user is represented by two attributes: location and information type. The attribute "location" takes as values prefecture names such as Kanagawa Prefecture and Kagawa Prefecture, and the information type takes the values weather and warning. In addition, suppose the situation in which the data, "No warning has been issued anywhere," is stored in the database 50.

The user inputs a sentence denoting the following type of request for information.

"Please inform me about warnings for Kanagawa Prefecture."

The sentence input unit 10 receives the input sentence from the user, and sends it to the sentence recognition unit 20. The sentence recognition unit 20 generates the content for the request of the user. At this point in time, due to reasons such as a recognition error, "Kanagawa Prefecture" is mistakenly recognized as "Kagawa Prefecture", and "warning" is not recognized at all. In this case, the content of the request that the sentence recognition unit 110 generates is as follows.

{<location, Kagawa Prefecture>}

At this point in time, there are no attributes approved by the user. The provided information type determining unit 30 makes a judgment based on the content of this request, and generates "warning" and "weather" as two information types. Assuming that the probabilities of the respective provided information types are equal, the probability of a warning is 0.5 and the probability of weather is 0.5.

At this point in time, the attributes that have not been approved by the user are location and information type. The dialogue sequence generating unit 40 generates all dialogue sequences for each of the two respective provided information types: warning and weather.

Here, for the provided information type "warning", two dialogue sequences, dialogue sequence A and dialogue sequence B, are generated. Dialogue sequence A is a dialogue sequence that confirms both of the two attributes "location" and "information type" until the user inputs approval, and subsequently, generates one response sentence having the content that no warnings have been issued for the location approved by the user. Dialogue sequence B is a dialogue sequence that confirms one of the attributes "location" or "information type" until the user inputs approval, and subsequently, generates one response sentence having the content that no warnings have been issued for anyplace.

For the provided information type "weather", two dialogue sequences, dialogue sequence C and dialogue sequence D, are generated. Dialogue sequence C is a dialogue sequence that confirms the location until the user inputs approval, and next, confirms information type until the user inputs approval, and finally, makes a response. Dialogue sequence D is a dialogue sequence that confirms the information type until the user inputs approval, and next, confirms the location until the user inputs approval, and finally makes a response.

The dialogue cost calculating unit 60 calculates the dialogue costs of the dialogue sequences A, B, C, and D. When the dialogue costs are calculated, here, it is assumed that the number of confirmation sentences will be twice the number of attributes to be confirmed.

In dialogue sequence A, the number of confirmation sentences output when confirming the two attributes "location" and "information type" until the approval is input from the user is estimated to be 4. When the information provider has approved, the confirmation sentence "Are you interested in warnings for Kanagawa Prefecture?" is output, the user approves this confirmation, and the one reply sentence "No warnings have been issued for Kanagawa Prefecture" is output. The dialogue cost is 5, which is the total of the numbers of confirmation sentences and response sentences.

In dialogue sequence B, first the confirmation sentence "Are you interested in warnings?" is output. The number of confirmation sentences output when confirming the one attribute "information type" until the approval is input from the user is estimated to be 2. When the user has approved the confirmation, the one response sentence "No warnings have been issued anywhere" is generated. The dialogue cost is 3, which is the total of the numbers of the confirmation sentences and response sentences.

In dialogue sequences C and D, because confirmation of one attribute will be carried out twice, the number of confirmation sentences is estimated to be 4. It is assumed that the response sentences are generated by the one sentence-type "what the weather is at a certain place and a certain time". The dialogue cost is 5, which is the total of the numbers of confirmation sentences and response sentences.

Next, the optimal dialogue sequence determination unit 70 determines the optimal dialogue sequence and optimal cost for each of the two provided information types, warnings and weather. For the provided information type "warning", the optimal dialogue sequence is B, and the optimal cost is 3. For the provided information type "weather", the optimal dialogue sequences are C and D, and the optimal cost is 5.

Next, for each of the attributes that have not been approved by the user, the control unit 130 instructs the next most optimal dialogue sequence unit 80 to calculate the next most optimal dialogue sequence and the next most optimal cost due to the confirmation of the attributes for each of the provided information types. The attributes not approved by the user are the two attributes "information type" and "location".

First, the processing for the next most optimal dialogue sequence for confirming the attribute "information type" will be shown. For the provided information type "warning", the optimal dialogue sequence B is the optimal dialogue sequence for confirming the information type, and the next most optimal cost is 3. For the provided information type "weather", the optimal dialogue sequence D is the optimal dialogue sequence for confirming the information type, and the next most optimal cost is 5.

Second, the processing for the next most optimal dialogue sequence for confirming the attribute "location" will be shown. For the provided information type "warning", the optimal dialogue sequence A is the optimal dialogue sequence for confirming the information type, and the next most optimal cost is 5. For the provided information type "weather", the optimal dialogue sequence C is the optimal dialogue sequence for confirming the information type, and the next most optimal cost is 5.

Next, the loss calculating unit 90 calculates the loss due to confirming attributes for each of the provided information types.

First, the calculation of the loss due to the confirmation of the attribute "information type" will be shown. For the provided information type "warning", the loss due to the confirmation of the information type is calculated by subtracting the optimal cost 3 from the next most optimal cost 3, giving 0. For the provided information type "weather", the loss due to the confirmation of the information type is calculated by subtracting the optimal cost 5 from the next most optimal cost 5, giving 0.

Second, the calculation of the loss due to the confirmation of the attribute "location" will be shown. For the provided information type "location", the loss due to the confirmation of the information type is calculated by subtracting the optimal cost 3 from the next most optimal cost 5, giving 2. For the provided information type "weather", the loss due to the confirmation of the information type is calculated by subtracting the optimal cost 5 from the next most optimal cost 5, giving 0.

Next, the expected loss calculating unit 100 calculates the expected value of the loss due to the confirmation of each of the attributes. The probability of the two provided information types "warning" and "weather" are both 0.5. Therefore, the expected loss due to the attribute "information type" is 0, and the expected loss due to the confirmation of the attribute "location" is 1.

Next, the confirmation attribute determination unit 110 determines the attribute "information type", for which the expected loss becomes small, to be the confirmation attribute. The sentence output unit 120 outputs confirmation sentences such as "Are you interested in warnings?" and "Are you interested in the weather or warnings?"

Because the expected loss due to the confirmation of the attribute "information type" is smaller than the expected loss due to the confirmation of the attribute "location", rather than outputting a confirmation sentence for requesting the confirmation of the location "Are you interested in Kagawa Prefecture?", outputting a confirmation sentence for requesting the confirmation of the information type "Are you interested in weather or warnings?" can maintain a small dialogue cost, and thus an increase in the dissatisfaction of the user that accompanies an increase in the number of confirmation sentences and response sentences for the user can be avoided.

Above, an embodiment of the present invention was explained, but the present invention is not limited by the embodiment described above, and various modifications can be applied thereto.

As explained above, according to the dialogue-type information providing system, when a user inputs as a character string or by speech a sentence denoting a request for information, for each attribute included in the content of the request that has not been approved by the user, an expected loss due to the confirmation of attributes is calculated, and an attribute that will make the expected loss minimal is given priority for confirmation, and thereby, the increase in dissatisfaction of the user that accompanies the increase in the number of confirmation sentences and response sentences output to the user that occur due to recognition error can be avoided.

(2)

Below, an embodiment of the present invention will be explained in detail while referring to the drawings.

Figure 3:
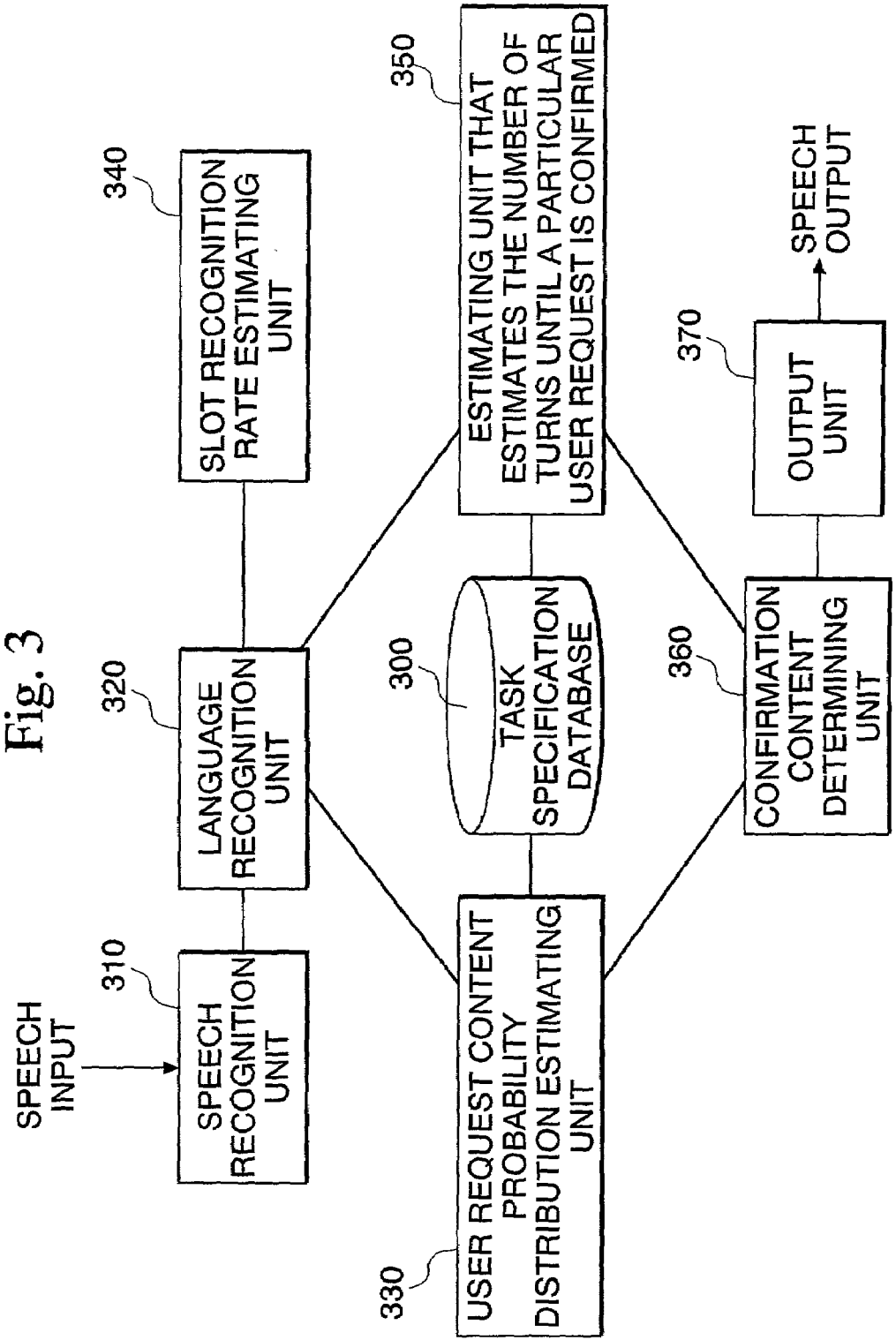
FIG. 3 is a block diagram of an example of he spoken dialogue apparatus of the present invention.

FIG. 3 is a function block diagram of an embodiment of a spoken dialogue apparatus according to the present invention. The present spoken dialogue apparatus comprises a task specification database 300, a speech recognition unit 310, a language understanding unit 320, a user request content probability distribution estimating unit 130, a slot recognition rate estimating unit 340, estimating unit 350 that estimates the expected number of turns until a particular request is confirmed, a confirmation content determination unit 360, and an output unit 370. Moreover, actually the present spoken dialogue apparatus is realized by a computer system comprising, for example, a CPU, a memory apparatus, and an input/output device.

Normally, in a spoken dialogue apparatus, for one task, there are a plurality of user requests that can be accepted. For example, in a spoken dialogue apparatus that carries out schedule management, at a minimum a plurality of user requests such as the addition, change, and confirmation of the schedule are necessary. In the present spoken dialogue apparatus, tasks that have a plurality of types of user requests can be handled.

Figure 4:
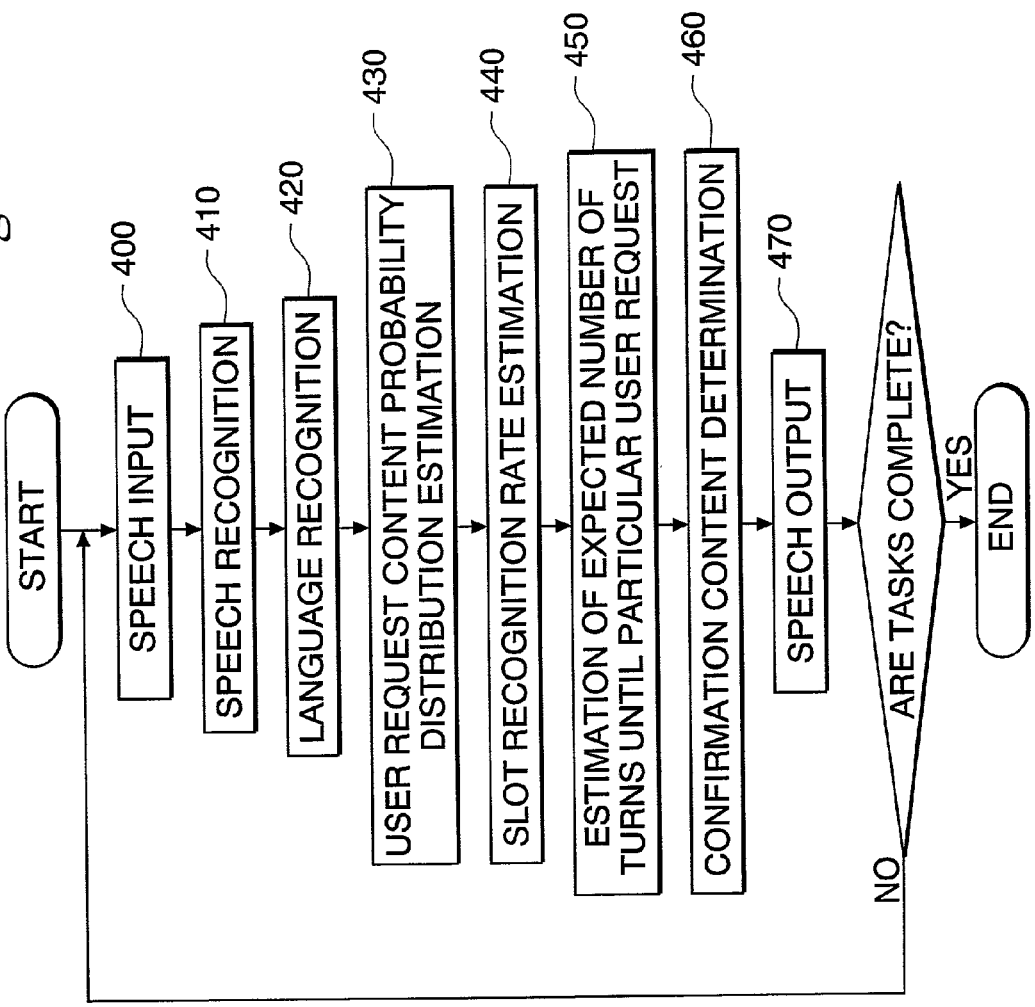
FIG. 4 is a processing flowchart.

FIG. 4 is a drawing showing a processing flowchart of the present spoken dialogue apparatus. The flow of the overall processing of the present spoken dialogue apparatus will be explained using FIG. 4. It is noted that step 430 can follow step 450.

In the task specification database 300, task methods that the apparatus can currently process are described and stored. The methods of the tasks broadly comprise two sets of information. The first is the type of the user request that can be handled by the apparatus, the necessary items for each of the user requests (slots), and the value range of the vocabulary that can be entered in its slot. The second is the dependency relationship between the vocabulary items. An example of a concrete description of the task specification database 300 will be explained below.

The spoken dialogue apparatus executes particular work (a task) while conversing with a person (user) by speech. The speech recognition unit 310 inputs the voice that expresses the requests of the users and the like (step 400), and convents this to a character string using speech recognition (step 410). The language understanding unit 320 converts the character string obtained by the speech recognition unit 110 into a recognition state by the apparatus (step 420). This recognition state is represented by a set of the attributes (item names), a value, and the likelihood of this value. This attribute is called a slot.

The user request content probability distribution estimating unit 330 estimates the probability distribution of the user request by using the recognition state obtained by the language understanding unit 320 (step 430). Here, the correlation between each of the user requests for task methods defined in the task specification database 300 and the state of recognition is calculated, and the result of this calculation serves as an approximation of the probability value.

The slot recognition rate estimating unit 340 inputs the vocabulary of the confirmation object (slot) of the recognition state obtained by the language understanding unit 320 from the task specification database 300, and estimates the expected recognition rate currently being confirmed by the speech recognition unit 310 (step 440). This estimated recognition rate is called the slot recognition rate. The estimating unit 350 that estimates the expected number of turns until a particular request is confirmed inputs a recognition state from the language understanding unit 320 and a slot recognition rate from the slot recognition rate estimating unit 340, and based on a task method of the task specification database 300, for all of the user request types that the apparatus can handle, the respective estimated number of turns for the case assuming that the user's request has been defined is estimated (step 450).

The confirmation content determination unit 360 inputs the probability distribution (the correlation between the current recognition state and each of the user requests) of the user requests from the user request content probability distribution estimating unit 330 and estimating unit 350 that estimates the expected number of turns until a particular request is confirmed, and determines the next confirmation content for the apparatus (step 460). The output unit 370 converts the confirmation content (confirmation/request) determined by the confirmation content determining unit 360 to speech, and outputs it (step 470).

The specified work (task) is completed by repeating the steps 400 to 4270 described above the desired number of times while conversing with the user, but in the present spoken dialogue apparatus, because the next confirmation/request is determined using the probability distribution of the user request with respect to the recognition state at each point in time and the expected number of turns until the completion of the confirmation of each of the user requests, the number of turns until the completion of the dialogue becomes small.

Moreover, it is possible to provide a program for executing on a computer a processing sequence such as that shown in FIG. 4 that records on computer readable recording media such as a floppy, CD-ROM, or the like. The periodic functions of each unit shown in FIG. 3 can be realized by loading a program recorded on this type of recording media into a computer.

Next, each of the components of the present spoken dialogue apparatus will be explained in detail.

Speech Recognition Unit 310

The user communicates the content of the request to the present spoken dialogue apparatus by speech. The speech from the user is converted into a character string using a speech recognition unit 310. Already available devices can be used for the speech recognition unit 310.

Language Understanding Unit 320

The character string obtained by the speech recognition unit 310 is converted to a recognition state by the language understanding unit 320. Already available devices can be used for this language understanding unit 320 as well. A sound score of, for example, an HMM (Hidden Markov Model) based speech recognition apparatus can be used to obtain the likelihood of the values necessary for the recognition state.

User Request Content Probability Distribution Estimating Unit 430

In the user request content probability distribution estimating unit 130, the probability distribution of the user request is estimated using the recognition state of the apparatus at a certain point in time.

Because actually obtaining a probability distribution is difficult, here, a method must be considered wherein, based on the task method of the task specification database 300, the correlation between each of the user requests that can be handled by the task and the recognition state is found, and this serves as an approximation of the probability value.

Here, the value of the slot $s_i$ of the recognition state is represented by $v_i$, and the reliability of this value is $c_i$. The likelihood of the slot whose confirmation the apparatus has completed is 1. In the user request $G_j$ that will serve as the object of confirmation, the number of necessary slots is $N_{Gj}$. When the number of user requests that can fall within the value range of the value $v_i$ of the slot is $M_{v_i}$, the value $v_i$ of the slot the correlation $Rel(S, G_j)$ between the recognition state S and the user request $G_j$ can be determined as follows:

$$Rel(S, G_j) = \frac{1}{N_{G_j}} \sum \frac{c_i}{M_{v_i}} \qquad \text{Eq. 1}$$

Slot Recognition Rate Estimating Unit 340

The present speech recognition apparatus switches the necessary vocabulary depending on the context of the conversation. For example, assume that the apparatus asks the user "What is the day of the recording time setting?" In this case, the vocabulary necessary for recognition is vocabulary that refers to "Monday", "Tuesday" and the like, and the vocabulary that is generally necessary after the dialogue proceeds with "yes" and "no". In contrast, assume that apparatus asks "What day and where Are you interested in an appointment?" In this case, the vocabulary that appears to be necessary is the vocabulary necessary to refer to locations, such as "Conference Room 3" or "Reception Room". Generally, if the number of vocabulary items increases, the possibility of recognition errors by the speech recognition unit 310 increases.

In the case that a slot (or plurality of slots) that is the recognition object of the apparatus is given, the slot recognition rate estimating unit 340 estimates the speech recognition rate expected during recognition. This estimated recognition rate is called the "slot recognition rate".

Assume that the recognition rate $r_b$ when using a certain number $n_b$ of vocabulary items, and assume that the number of vocabulary items that can be placed in the object slot group is $n_b$. Here, under these conditions, there are two methods for estimating the slot recognition rate r.

Method 1

An empirical law stating that wherein the recognition error rate is proportional to the square root of the number of vocabulary items is known. Using this empirical law, $$r = 1 - (1 - r_b)\sqrt{\frac{n}{n_b}}$$ Eq. 2

Method 2

For the likelihood of one word, when the likelihood of a different word exceeding this likelihood is p, the probability that all of n words will not exceed this likelihood is the nth power of (1-p). Because the recognition rate when the number of vocabulary items is $n_b$, then $$r_b = (1-p)^{n_b}$$ Eq. 3 should be satisfied, and thus the recognition rate when there are n words is $$r = r_b^{\frac{w}{w_b}}$$ Eq. 4

The Expected Number of Turns Estimating Unit 350

This expected number of turns estimating unit 350 estimates the expected number of turns until a particular request is confirmed until a particular request is confirmed.

In the case it is assumed that the estimation of the user request has been carried out correctly, the estimating unit 150 that estimates the expected number of turns until a particular request is confirmed estimates the number of turns until the completion of the confirmation of this particular user request.

If compared to the example of the spoken dialogue apparatus that carries out schedule management, this condition corresponds to estimating the number of turns that will be taken until the spoken dialogue apparatus grasps the content of the weekday, the schedule, and the like at the point in time that it correctly identifies that the user wants to add to a schedule, not confirm a schedule or the like.

Thus, first, a method can be considered for the case that the slot recognition rate is given, and the expected number of turns until the one confirmation/request completion is estimated.

For a confirmation from the spoken dialogue apparatus, if it is assumed that the user at least transmits to the apparatus a corresponding YES/NO, and then the YES/NO has been correctly transmitted to the apparatus, when the slot recognition rate is r, the expected number of turns for the confirmation/request can be found as follows:

The expected number of turns $t_{conf}$ necessary until the confirmation has completed is:

$$t_{conf} = \sum_{t=1}^{\infty} tr(1-r)^{t-1} = \frac{1}{r}$$ Eq. 5

The expected number of turns $t_{req}$ necessary until the request has completed is:

$$t_{req} = t_{conf} + 1 = 1 + \frac{1}{r}$$ Eq. 6

The expected number of turns necessary in the case of confirming or requesting a plurality of slots simultaneously can be considered in the same manner.

Next, a method will be considered for the case in which the slot recognition rate is given, and the expected number of turns until the confirmation of a particular user request is estimated.

In the recognition state of the spoken dialogue apparatus at this point in time, the necessary actions until confirmation of a particular user request can be represented as sets of pairs of names of slots and the necessary actions (confirmation or request) for this slot. The order of recognition in the case that this set of necessary action pairs has been determined, and from among these, the smallest number of expected turns is returned, can be considered. The reason is that the number of expected turns can be considered for all orders of all partitions of the set of necessary actions can be considered. Returning this minimum number of expected turns is the number of expected turns until a user request that provides a set of necessary action pairs from the present state.

Confirmation Content Determination Unit 360

In the confirmation content determination unit 360, at each point in time, the apparatus determines what should be confirmed/requested next. The output from the confirmation content determining unit 360 is information about a slot name (generally a plurality) and whether this is a confirmation or request.

The confirmation content determination unit 360 receives the probability distribution of a user request (the correlation between each user request and the recognition state) and the expected number of turns until the completion of each user request, and determines the confirmation content such that the number of expected turns until completion of the dialogue completes is minimal. The reason for receiving as input the probability distribution of the user request completes and the expected number of turns until each user request is that no matter how small the number of turns until the completion of the confirmation, if the probability thereof is extremely small, in the end, confirming whether or not the user request is correct means that the number of turns of the dialogue as a whole will increase.

The probability that the actual user request is $G_i$ is represented by $p_{Gi}$, and the expected number of turns until $G_i$ is represented as $t_{Gi}$. The number of turns until the apparatus recognizes that the assumed request of the user differs from the actual request of the user is assumed to be the same as the expected number of turns until the user request confirmation. In this case, for example, in an apparatus in which the possible number of user requests is two, the expected number of turns until the completion of the dialogue in the case that the dialogue proceeds in the order $G_1$ to $G_2$ can be considered to be:

$$p_{G_1}t_{G_1} + p_{G_2}(t_{G_1} + t_{G_2}) \qquad \text{Eq. 7}$$

and contrariwise, the expected number of turns until completion of the dialogue in the case that the dialogue proceeds in the order $G_2$ to $G_1$, can be considered to be:

$$p_{G_2}t_{G_2} + p_{G_1}(t_{G_1} + t_{G_2}) \qquad \text{Eq. 8}$$

Generally, even in the case that the spoken dialogue apparatus can accept a plurality of user requests, the following equation:

$$p_{G_{a(1)}}t_{G_{a(1)}} + p_{G_{a(2)}}(t_{G_{a(1)}} + t_{G_{a(2)}}) + \ldots + p_{G_{a(n)}}(t_{G_{a(1)}} + \ldots + t_{G_{a(n)}})$$

selects the selection order $a(1), a(2), \ldots a(n)$ of the user request that will be the smallest. In the case of assuming a user request wherein the head of this selection order is $G_{a(1)}$, the confirmation content output by the expected number of turns estimating unit 350 that estimates the expected number of turns until a particular request is confirmed becomes the output of he confirmation content determining unit 360.

Output Unit 370

The output unit 370 receives as input the slot name and the type of the confirmation/request output by the confirmation content determining unit 360, and outputs speech. The output unit 370 can be realized, for example, by the combination of an available template-based language generator and an available speech synthesizer.

Below, a concrete example of the processing in the present spoken dialogue apparatus will be given.

Here, a secretarial task in a company will be assumed, and as types of user requests, "in-house delivery", "call employee", "receive copy", and "confirmation of content of purchased items" can be handled. The respectively necessary information for each is as follows:

(i) "receiving in-house mail"

product name (in-house object), object department name (all names), object person name (all employees), numerical amount (1–10)

(ii) "call employee"

department name (related departments), person name (related persons), number representing the day (1–30)

(iii) "receive copy"

object of copy (some document), number of parts (1–100)

(iv) "confirmation of content of purchased items"

manufacturer's name (all makers in the catalogue), product name (products in the catalogue), amount (1–50)

Altogether, there are 100 departments, 1000 names, 500 product names, 50 department names, and 100 manufacturer's names, and the number of generally necessary vocabulary items for a dialogue includes "yes", "no" and the like is 100. In addition, as the basic capacity of the speech recognition unit 110, if there are 500 vocabulary items, recognition succeeds at a probability of 0.8.

Task Specification Database 300

Broadly, the task specification database 300 records the following two types of information:

(1) the necessary slots for each user request and the value range of the vocabulary that can be entered into this slot (2) the dependency relationships between vocabulary items Here, as an example of (1), the following type of information is recorded:

(i) "receiving in-house mail"

product name (in-house object), object department name (all names), object person name (all employees), numerical amount (1–10)

(ii) "call employee"

department name (related departments), person name (related persons), number representing the day (1–30)

(iii) "receive copy"

object of copy (some document), number of parts (1–100)

(iv) "confirmation of content of purchased items"

manufacturer's name (all makers in the catalogue), product name (products in the catalogue, amount (1–50)

In addition, as an example of (2), information such as the following is recorded:

Assignment is (business department)→name is any of (Sugiyama, Abe, Kondo, Oka, Suzuki)

Assignment is (planning department)→name is any of (Abe, Kachino, Kobayashi, Ando)

Assignment is (research department)→name is any of (Aikawa, Nakano, Inazoe, Ando, Suzuki)

Assignment is (general affairs)→name is any of (Nakano, Kobayashi, Suzuki, Nagai)

Name is (Sugiyama)→assignment is (business department)

Name is (Abe)→assignment is any of (business department, planning department)

Name is (Kondo)→assignment is (business department)

Name is (Oka)→assignment is (business department)

Name is (Suzuki)→assignment is any of (business department, research department, general affairs)

Name is (Kachino)→assignment is (planning department)

Name is (Kobayashi)→assignment is any of (planning department, general affairs)

Name is (Ando)→assignment is any of (planning department, research department)

Name is (Aikawa)→assignment is (research department)

Name is (Nakano)→assignment is any of (research department, general affairs)

Name is (Inazoe)→assignment is (research department)

Name is (Nagai)→assignment is (general affairs)

Speech Recognition Unit 310

In the speech recognition unit 310, the speech spoken by the user is received, and a character sequence is output. Here, assume that the user says "I want to send something to Mr. Ishimoto." This may not necessarily be correctly recognized, and may output the result of recognition (a character sequence) as the mistaken "Mr. Ishimoto, Japan Delivery . . . "

Below, an example of the actions to be taken in the case of this mistaken output will be given.

Language Understanding Unit 320

In the language understanding unit 320, the character string from the speech recognition unit 310 is input, and a recognition state is output. The recognition state is represented by (the set of the slot name, value, and likelihood of the value).

Here, assume that as a result of the recognition "Mr. Ishimoto, Japan Delivery . . . ", the following recognition state of the apparatus is output from the understanding unit 320:

(name=Ishimoto, likelihood=0.8)

(manufacturer=Japan Delivery, likelihood=0.7)

User Request Content Probability Distribution Estimating Unit 330

The user request content probability distribution estimating unit 330 calculates the probability of the user request that has been estimated from the current recognition state, but here, the correlation between each of he user requests and recognition states that can be handled by the apparatus are calculated using Eq. 1.

The current recognition state is (name=Ishimoto, likelihood=0.8) and (manufacturer=Japan Transport, likelihood=0.7).

The necessary number of slots for the user request "receive in-house delivery" is $N\_\{G\_j\}=4$, because there are four items: product name, object department name, object person name, and amount.

In contrast, the value range "name=Ishimoto" is recognized for in-house mail and call, and thus $M\_\{name=Ishimoto]=2$.

Thus, the correlation between the current state of recognition and in-house mail is:

Rel $\{S, G\_\{in\text{-}house\ mail\}\}=\frac{1}{4}*0.8/2=0.1$.

Similarly,

Rel $\{S, G\_\{call\}\}=\frac{1}{3}*0.8/2=0.13$

Rel $\{S, G\_\{copy\}\}=0$

Rel $\{S, G\_\{purchased\ items\}\}=\frac{1}{3}*0.7/1=0.23$.

Furthermore, each of the correlations is normalized so that the sum of the probabilities becomes 1. Thereby, the probabilities of each of the user requests become the following:

"in-house delivery"=0.22
"employee call"=0.28
"receive copy"=0
"confirm content of purchased items"=0.5

Slot Recognition Rate Estimating Unit 340

In the slot recognition rate estimating unit 340, in the case that the vocabulary items for the object of the confirmation are given, the speech recognition unit 310 estimates to what the degree of probability recognition has been correctly carried out. Here, the slot recognition rate r is calculated using Eq. 2 and Eq. 3.

Here, while there is no information that has been confirmed in the current recognition state, the number of vocabulary items necessary in the case that the apparatus queries the slot "name" is:

1000 (names)+(general vocabulary)=1100.

52

In the case of using method (1):

$r=1-(1-0.8)*sqrt(1100)/sqrt(500)=0.703$

In addition, in the case of using method (2):

$r=0.8^{(1100/500)}=0.61$

53

The estimating unit 150 that estimates the expected number of turns until a particular request is confirmed.

Here, for all of the user request types that can be handled by the apparatus, assuming that the estimation of the user request is correctly carried out, the expected number of turns until a particular user request is confirmation is calculated. The output is the number of turns and the action (confirmation/request) at this time.

For example, in the case that the user request "receive in-house delivery" is assumed, from the current recognition state:

(name=Ishimoto, likelihood=0.8)
(manufacturer=Japan Delivery, likelihood=0.7)
the necessary action is:
(product name, request)
(object department name, request)
(object person's name, confirmation)
(amount, request), and
(ignore manufacturer's name)

Here, if the information request and confirmation are carried out simultaneously, there are 5 combinations of actions (items appearing within the same parentheses are confirmed simultaneously):

A. (product) (department) (person's name) (amount)
B. (product department) (person's name) (amount)
C. (product amount) (department) (person's name)
D. (product) (department amount) (person's name)
E. (product department amount) (person's name)

Then for each of these, there are 44 combinations of actions for "in what order should the confirmations and requests be carried out?":

A. 4!=24
B. 3!=6
C. 3!=6
D. 3!=6
E. 2!=2

For each of these 44 combinations of actions, the number of turns until the user request content confirmation is estimated.

For example, consider the expected number or turns for (person's name)→(department amount)→(product).

Based on the number of vocabulary items (type of person's name+general vocabulary), the expected number of turns for the part "person's name" is estimated as $1/r\_1$ from the recognition rate $r\_1$ output by the slot recognition estimating unit 340.

If the (person's name) has been confirmed previously, the number of vocabulary items of the part (department amount) can be narrowed to the vocabulary for only the departments that a person called "Ishimoto" is affiliated with, not all departments. From the number of vocabulary items at this time, based on the recognition rate r_estimated by the slot recognition rate estimating unit 104, the number of turns necessary to confirm (department amount) can be estimated to be $1/r\_2$.

Similarly, the recognition rate $r\_3$ of the part (product) can also be estimated based on the number of vocabulary items (number of departments and general vocabulary), and the number of necessary turns is estimated to be $1/r\_3$.

Thus, the expected number of turns in (person's name)→(department amount)→product is $1/r\_1+1/r\_2+1/r\_3$.

Similar calculations are carried out for all 44 combinations. Among these, the combination that produces the smallest value becomes the output of estimating unit 350 that estimates the expected number of turns until a particular request is confirmed.

Confirmation Content Determining Unit 360

Here, what the apparatus should confirm or what information should be requested is determined from the number of turns output by estimating unit 350 that estimates the expected number of turns until a particular request is confirmed and the probability distribution output by the user request content probability distribution estimating unit 330.

Here, as output of estimating unit 350 that estimates the expected number of turns until a particular request is confirmed and the user request content probability distribution estimating unit 330, the number of turns and the probability distributions are obtained:

"in-house delivery": 8 turns, 0.22
"call employee": 10 turns, 0.28
"receive copy": 12 turns, 0
"confirm content of purchase": 5 turns, 0.5

Tentatively, the confirmation is carried out in the following order:

1. Take 8 turns to confirm whether or not the request content of the user is "in-house delivery". If this succeeds, the confirmation ends. If this fails, assume the original recognition state, and go to 2.

2. Take 8 turns to confirm whether or not the request content of the user is "call employee". If this succeeds, the confirmation ends. If this fails, assume the original recognition state, and go to 3.

3. Take 8 turns to confirm whether or not the request content of the user is "receive copy". If this succeeds, the confirmation ends. If this fails, assume the original recognition state, and go to 4.

4. Since the request content of the user can only be "confirmation of purchase content", take 8 turns to confirm whether or not the request content of the user is "confirmation of purchase content".

The expected number of turns is:

$$0.22*8+0.28*(8+10)+0*(8+10+12)+0.5*(8+10+12+5).$$

The above calculation is carried out for all 4!=24 combinations, substituting the order "in-house delivery", "employee call", "receive copy", and "confirm content of purchase". This selects the order such that the result becomes the smallest, and for the user request content that should be first confirmed at this time, the action output by estimating unit 150 that estimates the expected number of turns until a particular request is confirmed is output.

The action is the slot name and request or confirmation and slot values, for example, "department, request, none" or "person's name, confirmation, Ishimoto".

Output Unit 370

The output unit 370 inputs the output of the confirmation content determining unit 360, and outputs a speech to the user.

For example, in the case that "department, confirmation, none" is output, the output unit 370 outputs "please tell me the department name". In addition, in the case that "person's name, confirmation, Ishimoto" is input, the unit outputs "Is your name Mr. Ishimoto?"

Moreover, in the case of the conventional spoken dialogue apparatus, a per-determined confirmation sequence is carried out. For example:

1. in the case of a confirmation sequence for confirming each unconfirmed item in the recognition state one item at a time, the confirmation "Are you Mr. Ishimoto?" is carried out;

2. in the case of a confirmation sequence for confirming all at once the unconfirmed items in the recognition state, the confirmation "Mr. Ishimoto, Japan Delivery?" is carried out;

3. in the case of a confirmation sequence in which the user is questioned in a pre-determined sequence until the content of the user's request, "What is the family name?" is heard.

In any of these cases, the increase in the number of dialogue exchanges until the dialogue ends cannot be avoided.

As explained above, when using the spoken dialogue apparatus according to the present invention, even when the task is updated confirmation can be carried out using a small number of dialogue exchanges, and the number of dialogue exchanges until the completion of the dialogue can be made small.

(3)

3. Calculating the Dialogue Cost

As described above, the dialogue control in the dialogue-type information providing processing system and the spoken dialogue information processing system entail calculating the dialogue cost. That is, the dialogue efficiency is controlled so as to minimize the dialogue cost. The method for calculating the dialogue cost in the spoken dialogue system will be shown below. The dialogue cost is found as the total of the confirmation cost and the information transfer cost.

In order to calculate the confirmation cost, one turn comprises a system confirmation dialogue (for example, "Are you interested in Kanagawa Prefecture?", an information request dialogue (for example, "What time is it?"), or an approval dialogue (for example, "Yes."), taking into account the expected value of the number of turns necessary until one confirmation action or information request action is complete. In the following, it is assumed that the confirmation rate for each of the attributes is given in advance. The probability of correctly recognizing in one turn the value of all attributes given in the attribute set is called the recognition rate of the attribute set, and can be calculated as the norm of the recognition rate of each of the attributes. In addition, it is assumed that each of the systems can always recognize the spoken approval of the user.

Consider the confirmation action for ascertaining the values of all the attributes included in the set when the set of attributes is given. An action series is assumed in which the dialogue between the system and the user carries out a confirmation dialogue by the system submitting once all of the attribute values, and in the case that the value of an attribute provided by the system is mistaken, the user repeats turns in which a correction conversation is carried out by presenting all of the attribute values. If the attribute value presented by the system is correct, an approval conversation is carried out. If the recognition rate of the attribute set is p, the following equation gives the expected value of the number of turns until the confirmation action is complete:

$$TURN_c = \sum_{i=1}^{\infty} ip(1-p)^{(i-1)} = \frac{1}{p} \qquad \text{Eq. 10}$$

When the values of attributes are not given, the information confirmation action first carries out the information request dialogue one time, and subsequently takes the same action sequence as the confirmation action. Therefore, the following equation gives the expected value of the number of turns until the information request action is complete:

$$TURN_d = 1 + TURN_c = 1 + \frac{1}{p} \qquad \text{Eq. 11}$$

Next, the length of the confirmation action and the information request action will be considered. The length of each of the actions is the total of the lengths of the system utterances and user utterances included in each of the turns that is required to execute the action. The length of one system confirmation utterances and information request utterances, and the length of one user correction utterances are defined as the number of attributes included in the conversation. The length of a user approval dialogue is 1.

Consider the length of a confirmation action. If the number of attributes to be confirmed is m, in the system confirmation dialogue and the user correction dialogue, because it is assumed that all attributes will always be referred to, except for the last one turn, a turn includes a user correction utterances having a length m, and in the last turn, a system confirmation utterances having a length m and a user approval utterances having a length 1 are included. Therefore, the length of one confirmation dialogue is defined by the following equation:

$$LEN_c = 2m(TURN_c - 1) + m + 1 = \frac{2m}{p} - m + 1 \qquad \text{Eq. 12}$$

The length of the information request action is represented by the following equation:

$$LEN_d = 2m(TURN_d - 1) + m + 1 = \frac{2m}{p} + m + 1 \qquad \text{Eq. 13}$$

The confirmation cost of the dialogue procedure is defined as the lengths of the confirmation actions and information transfer actions included in the dialogue procedure.

Next, the information transfer cost will be calculated. The information transfer cost is the expected value of the length of the system response generated in order to execute the information transfer action. The length of the system response is defined as the numerical expected value of the content included in the response. For example, when the information transfer operation executes as a system response "No warnings have been announced anywhere", which includes the three expressions "warning", "anywhere", and "not announced" as the language of the content, the information transfer cost is 3.

In addition, there are cases in which there are a plurality of values of the attribute confirmed by the confirmation action and the information request, a value cannot be determined unless a dialogue is actually carried out, and a system response to be generated as the information transfer action cannot be unambiguously determined. In this case, it is assumed that the probability of obtaining an attribute and the probability of the occurrence of the value are equal, and thus the expected value of the length of the system response when taking into consideration all combinations of values is defined and calculated as the information transfer cost.

What is claimed is:

1. A dialogue-type information providing apparatus comprising the steps of outputting a confirmation sentence that requests confirmation of the content of the request from the user when the user inputs a sentence that denotes a request for information; recording the content of the request approved by the user when the user inputs a sentence denoting approval of the confirmation; waiting for the user to input a sentence denoting the request for new information in the case that the user inputs the sentence denoting disapproval of the confirmation; and outputting to the user a response sentence for providing the information that depends on the content of the request approved by the user after the information type to be provided to the user is determined unambiguously, the apparatus comprising:

an input device that receives from the user the request for information, approval of confirmations, and disapproval of confirmations;

a sentence recognizing device that, in the case a user inputs a sentence denoting a request for information, generates a set of combinations of attributes and values that represent the content of the request of the user by making a judgment based on the content of the request of the user recorded at the point in time that the content of input sentence and the sentence are input, records the set of combinations of attributes and values as the content of the request of the user, and when the user inputs a sentence denoting the approval of the confirmation sentence for the confirmation sentence requesting confirmation of the attributes, the attributes are recorded as the content of requests approved by the user;

a provided information type determining device that determines as provided information types all types of information that can be provided to the user by making a judgment based on the content of the request input by the user and the content of the requests approved by the user, and at the same time, calculates the probability of the provided information type;

a dialogue sequence generating device that, for each of the provided information types, requests confirmation of all or a part of the attributes that form the content of the requests that have not been approved by the user, and after the user approves the confirmations, generates a dialogue sequence in which information is provided depending on the content of requests approved by the user, and a dialogue sequence in which information is provided depending on the content of the request where confirmation is not carried out;

a dialogue cost calculating device that, for each of the dialogue sequences, estimates the total of the numbers of the confirmation sentences and response sentences included in the dialogue sequence, and calculates the estimated total as the dialogue cost;

an optimal dialogue sequence determining device that, for each of the provided information types, selects the dialogue sequence having the minimal dialogue cost, makes the dialogue sequence having the minimal dialogue cost the optimal dialogue sequence, and makes the minimum dialogue cost the optimal cost;

a next most optimal dialogue sequence determining device that, for each of the provided information types, selects the dialogue sequence that first requests confirmation of the designated attribute, selects the dialogue sequence having the minimum dialogue cost from among the dialogue sequences, makes this the next most optimal dialogue sequence for confirmation the attributes, and makes the minimum dialogue cost the next most optimal cost for confirming the attributes;

a loss calculating device that, for each of the provided information types, subtracts said optimal cost from said next most optimal cost, and makes the number that is the result of this subtraction the loss due to confirmation of the attributes;

an expected loss calculating device that calculates the expected value of the loss that takes into consideration the probability of the provided information type based on said loss due to confirmation of the attributes for each of the provided information types;

a confirmation attribute determining device that, for each of the attributes included in the content of the request that have not been approved by the user, compares the expected losses due to confirmation of each of the attributes, selects the attribute having the minimum expected loss, and determines said attribute to be the confirmation attribute; and an output device that outputs to the user a confirmation sentence to request confirmation said determined confirmation attribute.

2. A dialogue-type information providing apparatus according to claim 1 that judges that confirmation is not necessary if there is a dialogue sequence that outputs a response sentence that does not carry out confirmation as an optimal cost dialogue sequence; and outputs a response sentence depending on said dialogue sequence.

3. A spoken dialogue apparatus according to claim 1 comprises a database that records as methods for tasks that can be processed by said spoken dialogue apparatus at least the type of the user request, items necessary for each user request, and the dependency relationships between the value range of the vocabulary that can be entered for each of the items and the vocabulary.

4. A dialogue-type information providing processing method that comprises the steps of outputting a confirmation sentence that requests confirmation of the content of the request from the user when the user inputs a sentence that denotes a request for information; recording the content of the request approved by the user when the user inputs a sentence denoting approval of the confirmation; waiting for the user to input a sentence denoting the request for new information in the case that the user inputs the sentence denoting disapproval of the confirmation; and outputting to the user a response sentence for providing the information that depends on the content of the request approved by the user after the information type to be provided to the user is determined unambiguously, comprising the steps of:

inputting a sentence denoting a request for information from a user;

generating a set of attributes and values that represent the content of the request of the user by making a judgment based on the content of the sentence denoting the input request for information and the content of the request of the user recorded at the point of time that said sentence is input, and recording said set of combinations of attributes and values as the content of the request of the user;

determining all the types of the information that can be provided to a user as provided information types based on the content of the request input by the user, and at the same time, calculating the probability of the provided information types;

requesting confirmation of all or part of the attributes that form the content of the request for each of the provided information types, and after the user has approved the confirmation, generating a dialogue sequence that provides information depending on the content of the request and a dialogue sequence that provides information depending on the content of the request without carrying out a confirmation;

estimating the total of the numbers of the confirmation sentences and the response sentences included in the dialogue sequence for each of the dialogue sequences, and calculating the estimated total as the dialogue cost;

selecting the dialogue sequences having the minimum dialogue cost for each of the provided information types, making the dialogue sequence having the minimal dialogue cost the optimal dialogue sequence, and making said minimum dialogue cost the optimal cost;

selecting the dialogue sequence that first requests confirmation of the designated attributes for each of the provided information types, selecting the dialogue sequence having the minimal dialogue cost from among said dialogue sequences, making this the next most optimal dialogue sequence for confirmation of the attributes, and making said minimal dialogue cost the next most optimal cost for confirmation of the attributes;

subtracting said optimal cost from said next most optimal cost for each of the provided information types, and making the number that is the result of this calculation the loss due to the confirmation of the attributes;

calculating the expected value of the loss taking into consideration the probability of the provided information types based on the loss due to the confirmation of said attributes for each of the provided information types, and making said expected value the expected loss due to the confirmation of the attributes;

comparing the expected loss due to the confirmation of each of the attributes for each of the attributes included in the content of the request, selecting the attribute having the minimal expected loss, and determining said attribute to be the confirmation attribute; and outputting to the user a confirmation sentence requesting confirmation of said determined confirmation attribute.

5. A dialogue-type information providing processing method according to claim 4 wherein, if there is a dialogue sequence that outputs a response sentence without carrying out a confirmation as an optimal cost dialogue sequence, outputs a response sentence depending so said dialogue sequence by making a judgment that carrying out confirmation is not necessary.

6. Computer readable recording media that stores a program for executing on a computer the dialogue-type information providing processing method according to claim 3 and claim 4.

7. A computer readable medium that records the program for executing on a computer the processes of the spoken dialogue processing method according to claim 4.

* * * * *